United States Patent
Rizkalla

(10) Patent No.: US 12,454,919 B2
(45) Date of Patent: Oct. 28, 2025

(54) EXHAUST COOLING INJECTION FOR IMPROVED TURNDOWN

(71) Applicant: Power Systems Mfg., LLC, Jupiter, FL (US)

(72) Inventor: Hany Rizkalla, Stuart, FL (US)

(73) Assignee: Power Systems Mfg., LLC, Jupiter, FL (US)

( * ) Notice: Subject to any disclaimer, the term of this patent is extended or adjusted under 35 U.S.C. 154(b) by 0 days.

(21) Appl. No.: 18/791,552

(22) Filed: Aug. 1, 2024

(65) Prior Publication Data

US 2025/0043735 A1    Feb. 6, 2025

Related U.S. Application Data

(60) Provisional application No. 63/516,917, filed on Aug. 1, 2023.

(51) Int. Cl.
| | |
|---|---|
| *F02C 9/18* | (2006.01) |
| *F01K 23/10* | (2006.01) |
| *F02C 7/141* | (2006.01) |
| *F02C 9/26* | (2006.01) |

(52) U.S. Cl.
CPC ............... *F02C 9/18* (2013.01); *F01K 23/10* (2013.01); *F02C 7/141* (2013.01); *F02C 9/26* (2013.01)

(58) Field of Classification Search
CPC ...... F02C 9/18; F02C 9/52; F02C 9/26; F02C 7/141; F02C 7/143; F01D 21/00; F01D 21/06; F01D 21/12; F01K 23/10
See application file for complete search history.

(56) References Cited

U.S. PATENT DOCUMENTS

| | | | | |
|---|---|---|---|---|
| 6,027,304 A | * | 2/2000 | Arar ................ | F02C 7/045 415/176 |
| 2009/0053036 A1 | * | 2/2009 | Crawley ............ | F02C 9/52 415/58.4 |
| 2014/0126991 A1 | * | 5/2014 | Ekanayake ........ | F01D 25/12 415/1 |
| 2017/0030228 A1 | * | 2/2017 | Jordan, Jr. ........ | F02C 7/18 |
| 2020/0291871 A1 | * | 9/2020 | Bulat ................ | F02C 9/20 |
| 2021/0324805 A1 | * | 10/2021 | Meunier ............ | F01D 21/14 |

* cited by examiner

*Primary Examiner* — Thuyhang N Nguyen
(74) *Attorney, Agent, or Firm* — Hovey Williams LLP

(57) ABSTRACT

A gas turbine engine including an exhaust bleed (ExB) system and methods of operating the same to achieve increased turndown while maintaining emissions under a compliance limit. The method includes continuously decreasing a load of the gas turbine engine below a base load, and, as the load is continually decreased, continuously determining a reference load. When the reference load reaches a first threshold value, the method includes operating an inlet bleed heat (IBH) system of the gas turbine engine according to a first schedule. When the reference load reaches a second threshold value, the method includes operating the IBH system according to a second schedule. When the reference load reaches a third threshold value, the method includes operating the ExB system according to a third schedule. When the reference load reaches a fourth threshold value, the method includes adjusting an exhaust gas temperature setpoint of the gas turbine engine.

15 Claims, 8 Drawing Sheets

EXHAUST COOLING INJECTION FOR IMPROVED TURNDOWN

BACKGROUND

The present disclosure generally relates to gas turbine engines. More particularly, aspects of the disclosure relate to gas turbine engines configured to achieve increased turndown.

Recently there has been a push in the gas turbine engine industry to provide solutions allowing for a safe decrease of the minimum operating load of a gas turbine engine. However, as operating load is decreased below a base load, emissions increase rapidly and quickly become out of compliance with regulatory standards. Emission levels are therefore often the limiting factor dictating how much turndown a gas turbine engine can achieve. Increasing an exhaust gas temperature of the gas turbine engine can facilitate reducing emissions levels. However, increasing the exhaust gas temperature of the gas turbine engine in a combined cycle operation may be limited by downstream components, such as a heat recovery steam generator.

BRIEF DESCRIPTION

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a method of operating a gas turbine engine during a period of turndown is provided. The method includes continuously decreasing a load of the gas turbine engine below a base load. As the load is continually decreased, the method includes continuously determining a reference load for the gas turbine engine. Furthermore, the method includes operating an inlet bleed heat (IBH) system of the gas turbine engine according to a first schedule when the reference load reaches a first threshold value. The method also includes operating the IBH system according to a second schedule when the reference load reaches a second threshold value. Furthermore, the method includes operating an exhaust bleed (ExB) system of the gas turbine engine according to a third schedule when the reference load reaches a third threshold value. Moreover, the method includes adjusting an exhaust gas temperature setpoint of the gas turbine engine when the reference load reaches a fourth threshold value.

In another aspect, a gas turbine engine is provided. The gas turbine engine includes an air inlet, a compressor downstream of the air inlet and fluidly connected to the air inlet via an inlet duct, a compressor discharge casing downstream of the compressor, a combustion system downstream of the compressor discharge casing, a turbine downstream of the combustion system, and an exhaust system downstream of the turbine. The gas turbine engine also includes an inlet bleed heat (IBH) system including IBH piping fluidly connecting the compressor discharge casing to the inlet duct and an IBH valve configured to open and close the IBH piping. In addition, the gas turbine engine includes an exhaust bleed (ExB) system including ExB piping fluidly connecting the compressor discharge casing to the exhaust system and an ExB valve configured to open and close the ExB piping. Furthermore, the gas turbine engine includes a controller configured to operate the IBH system by opening the IBH valve, operate the ExB system by opening the ExB valve, and adjust an exhaust gas temperature setpoint of the gas turbine engine, during a period of turndown. With both the IBH system and the ExB system operating, and the exhaust gas temperature being adjusted, the gas turbine engine is configured to achieve a greater turndown while maintaining NOx and CO emissions within a compliance limit than if the gas turbine engine was not equipped with the ExB system.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION

The following detailed description of embodiments of the disclosure references the accompanying figures. The embodiments are intended to describe aspects of the disclosure in sufficient detail to enable those with ordinary skill in the art to practice the disclosure. The embodiments of the disclosure are illustrated by way of example and not by way of limitation. Other embodiments may be utilized, and changes may be made without departing from the scope of the claims. The following description is, therefore, not limiting. The scope of the present disclosure is defined only by the appended claims, along with the full scope of equivalents to which such claims are entitled.

Exemplary System

Figure 1:
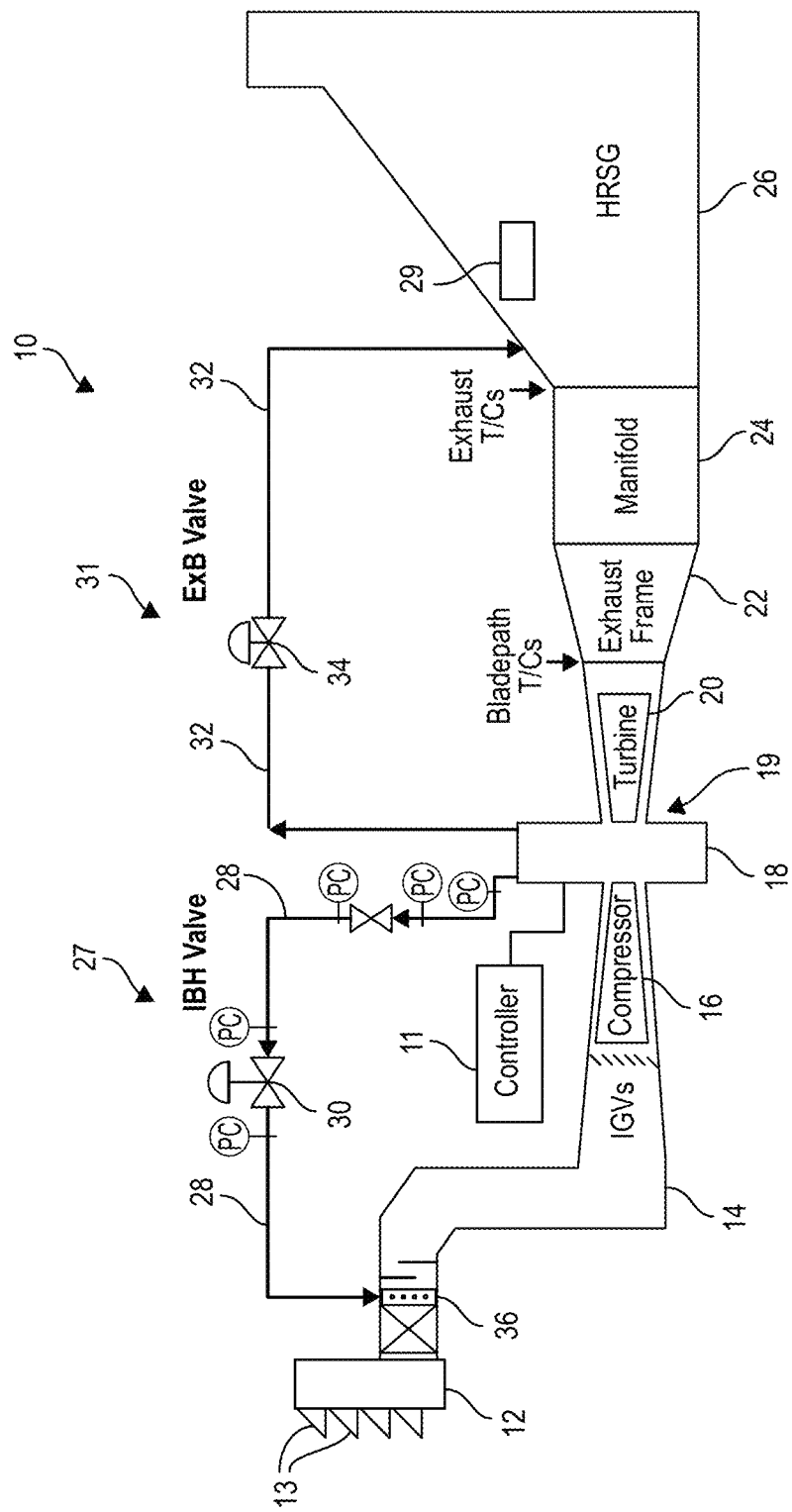
FIG. 1 is a schematic representation of a gas turbine engine including an inlet bleed heat system and exhaust bleed system according to aspects of the disclosure.
Figure 2:
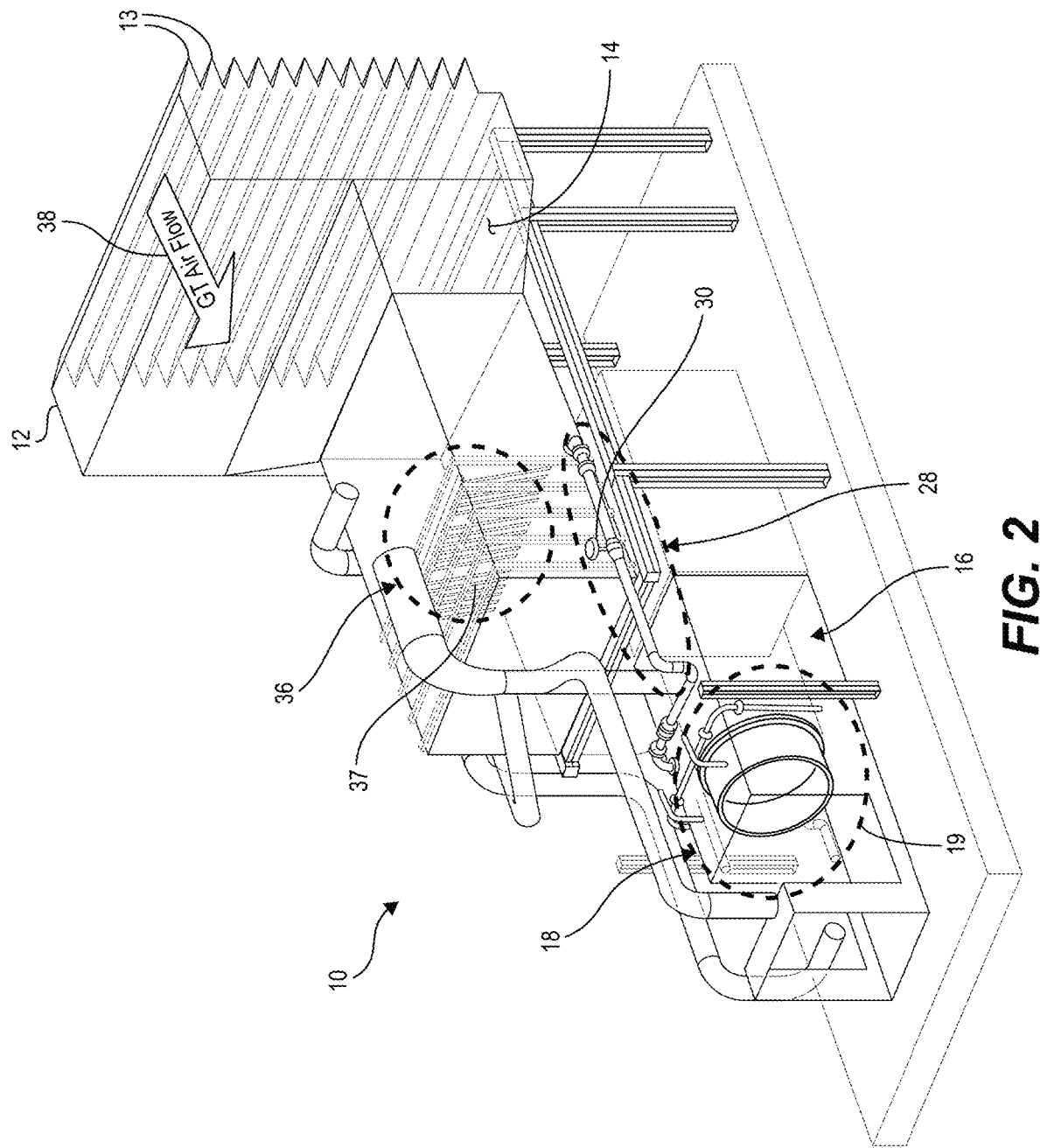
FIG. 2 is perspective view of a portion of the gas turbine engine schematically represented in FIG. 1.

FIG. 1 is a schematic of a gas turbine engine 10 including an inlet bleed heat (IBH) system 27 and an exhaust bleed (ExB) system 31, in accordance with certain aspects of the present disclosure. FIG. 2 is a perspective view of a portion of the gas turbine engine 10 showing various components in more detail. In the example embodiment, the gas turbine engine 10 includes an air inlet 12 for channeling ambient air (depicted in FIG. 2 as a gas turbine air flow 38) to an inlet duct 14. The inlet duct 14 channels the gas turbine air flow 38 entering through the air inlet 12 to a compressor 16 of the gas turbine engine 10. The compressor 16 includes a series of stationary vanes (not shown) and rotating blades (not shown) that generally compress the gas turbine air flow 38 flowing therethrough, thereby increasing the pressure of the gas turbine air flow 38. The compressed gas turbine air flow 38 passes through a discharge casing 18 (also referred to herein as an "extraction manifold"). The discharge casing/extraction manifold 18 is operatively connected to the IBH system 27 and the ExB system 31, as described in more detail below.

The gas turbine air flow 38 is channeled from the compressor 16 to a combustion system 19. In the combustion system 19, fuel is mixed with the gas turbine air flow 38 in one or more combustion chambers (not shown) and ignited. Resultant hot combustion gases are then channeled into a turbine 20. The hot combustion gases drive rotation of the turbine 20. The turbine 20 is coupled to the compressor 16 by a common shaft (not shown). Thus, as the turbine 20 rotates, the compressor 16 rotates. In some embodiments, the rotation of the common shaft drives a generator (not shown) for electrical applications. In the exemplary embodiment, after the hot combustion gases pass through the turbine 20 (and thus most of the thermal energy has been extracted therefrom), the hot combustion gases are channeled to an exhaust system. The exhaust system includes an exhaust frame 22, an exhaust manifold or plenum 24, and a heat recovery steam generator (HRSG) 26.

In the exemplary embodiment, the HRSG 26 is configured to recover heat from the hot exhaust gases to produce steam to drive a steam turbine (not shown). The inclusion of the HRSG 26 (i.e., combined cycle operation) requires that the exhaust gases leaving the gas turbine engine 10 be within a specific temperature range.

During minimum load conditions, the gas turbine exhaust temperature is typically high due to lower gas turbine compressor flows. The high exhaust gas temperature typically increases the steam temperature in the HRSG and an attemperation system is thus required to control and maintain the steam high pressure steam temperature within specified limits. As such, in the example, the HRSG 26 may include an attemperation system 29. The attemperation system 29 is configured to introduce water and/or saturated steam to superheated steam generated by the HRSG 26. However, excessive attemperation due to high gas turbine exhaust temperature may yield to lower saturation margin in the steam supply and may cause water droplet formation, which is highly undesirable for the steam turbine from a durability and erosion standpoint.

The exhaust gas temperature cannot be too low, otherwise the decreased temperature may result in increased degrading of components of the steam turbine (not shown) due to continuous changes in the steam condition, such as decreased temperature of the superheated steam produced by the HRSG 26. These exhaust gas temperature constraints may limit the output of the gas turbine engine 10 and efficiency at all load points.

Typically, gas turbine engines, such as the engine 10 shown in FIGS. 1 and 2, are designed to provide emissions of carbon monoxide (CO) and/or nitrogen oxides (NOx) below a governmentally mandated limit when operating at or above a base load. However, it is often desirable to decrease the gas turbine engine's operating speed and/or load to a load value below the base load during periods of decreased demand and/or low energy prices. Operating the gas turbine engine 10 at such a decreased load is referred to operating the gas turbine engine in a "turndown" mode. Turndown operation, however, increases CO and/or NOx emissions. Consequently, when load is decreased past a certain threshold, emissions can increase to unacceptable levels. When the emissions increase to unacceptable levels, the gas turbine engine 10 must either be shut down or the operating load must be increased to bring emissions levels back within acceptable limits. This results in inefficient operation of the gas turbine engine 10.

In the example embodiment, the IBH system 27 is configured to bleed a portion of the compressed gas turbine air flow 38 (referred to herein as "IBH air") from the discharge casing/extraction manifold 18 and channel it upstream to the inlet duct 14 to mix with the ambient air being drawn though the air inlet 12. This allows for greater turndown while keeping emissions at an acceptable level. More particularly, during turndown, fuel flow to the gas turbine engine 10 is reduced and the inlet guide vanes 13 (shown in FIG. 2) located at the air inlet 12 are proportionally closed to reduce air flow. The reduced airflow facilitates maintaining a fuel/air ratio for the gas turbine engine 10 at optimum levels for low emission operation. The compressor inlet air temperature is controlled using the extracted IBH air. By controlling the temperature of the blended gases supplied through the inlet guide vanes 13 and the IBH air to the compressor 16 the gas turbine engine 10 is able to operate at a decreased turndown load.

In the example embodiment, the IBH system 27 includes IBH piping 28 fluidly connecting the discharge casing/extraction manifold 18 to the inlet duct 14 and, more particularly, to an injection manifold 36 located in the inlet duct 14. The IBH system 27 also includes an IBH valve 30 operatively connected to the IBH piping 28. During normal (i.e., base load) operation of the gas turbine engine 10, the IBH valve 30 is closed to prevent compressed air from passing through the IBH piping 28 to the inlet duct 14. However, as the load is decreased and the gas turbine engine 10 enters a period of turndown, the IBH valve 30 is opened to bleed a portion of compressed air (i.e., "IBH air") back to the inlet duct 14, which facilitates reducing emissions to an acceptable level during turndown. The IBH air is channeled to the injection manifold 36. In some embodiments, the injection manifold 36 includes a plurality of generally vertically extending pipes 37 or similar (shown in FIG. 2) that inject the IBH air (i.e., a portion of the hot, compressed gas turbine air flow 38) into the ambient air flowing into the gas turbine engine 10, thereby mixing the IBH air with the ambient air and ultimately rerouting it through the inlet duct 14 to the compressor 16. By recirculating a portion of the compressed gas turbine air flow 38 from the compressor 16 (and, more particularly, the compressor discharge casing/extraction manifold 18) back to the inlet duct 14, the IBH system 27 allows for further closure of the inlet guide vanes 13 past an original design point without impacting compressor stall, surge, and/or icing margins. This further closure of the inlet guide vanes 13 also facilitates increasing an exhaust gas temperature, thereby enabling the gas turbine engine 10 to operate at decreased turndown loads while maintaining emissions within acceptable limits. This permits further turndown of the gas turbine engine 10 while maintaining a fuel/air ratio at optimum levels for maintaining such low emissions.

While the IBH system 27 can improve emissions during turndown, turndown is still limited with such a system. For example, as noted above, the reduced turbine airflow 38 and associated reduced working turbine pressure ratio during turndown with the IBH system 27 results in under expansion and increased turbine exhaust temperature, limiting the amount of bleed air that can be extracted when the maximum turbine exhaust temperature is reached.

In the example embodiment, the gas turbine engine 10 is further equipped with the ExB system 31. The ExB system 31 enables the gas turbine engine 10 to achieve increased turndown. The ExB system 31 permits a portion of the gas turbine air flow 38 to bypass the combustor 19 and the turbine 20 without affecting the compressor 16, the combustor 19, and the turbine 20 design points, thus allowing for increased turndown of the gas turbine engine 10, all while maintaining emissions at acceptable levels. More particularly, the ExB system 31 extracts additional compressor discharge air (i.e., a portion of the gas turbine air flow 38, also referred to herein as "ExB air") and reinjects the ExB air downstream of the turbine 20 exhaust, and more particularly into the exhaust system (e.g., the exhaust frame 22, exhaust manifold or plenum 24, and/or the HRSG 26).

The ExB system 31 includes ExB piping 32 fluidly connecting the compressor discharge casing/extraction manifold 18 to the exhaust system. More particularly, although in the FIG. 1 schematic the ExB air is routed directly to an inlet of the HRSG 26, in other embodiments the ExB air can be routed to a different exhaust component such as, for example, the exhaust frame 22 or the exhaust manifold or plenum 24 (FIGS. 5-7) without departing from the scope of the disclosure. The ExB system 31 also includes an ExB valve 34 operatively connected to the ExB piping 32. During normal (i.e., base load and above) operation of the gas turbine engine 10, the ExB valve 34 is closed and thus no compressed air passes through the ExB piping 32 to the exhaust manifold 24 and/or the HRSG 26. However, as the load is decreased and the gas turbine engine 10 enters a period of turndown, the ExB valve 34 is opened to bleed compressed air downstream to the exhaust manifold or plenum 24, HRSG 26, or other exhaust component to reduce emissions to an acceptable level. As will be discussed in more detail below in connection with FIGS. 8-10, in some embodiments the ExB system 31 may be operated only after operating the IBH system 27 to some extent. For example, in some embodiments the ExB system may be utilized once the IBH valve 30 is fully open and thus approximately 5% of the compressor air is being bled to the inlet duct 14 via the IBH system 27.

In the example, the ExB air is cooler than the exhaust gas air. Mixing of the hot exhaust gas air with the cooler ExB air reduces the overall exhaust gas temperature downstream from the mixing. Accordingly, the gas turbine engine 10 may be operated with an increased exhaust gas temperature, such as an exhaust gas temperature that is higher than an inlet gas temperature limit of the HRSG 26. Increasing the exhaust gas temperature of the gas turbine engine 10 during turndown facilitates achieving additional turndown. For example, in an embodiment, the ExB air may account for about ten percent (10%) of the gas turbine air flow 38 in the discharge casing/extraction manifold 18. The bypassing of the ExB air may result in about an additional ten percent (10%) to fifteen percent (15%) reduction of the minimum load output (measured in Megawatts (MW)) of the gas turbine engine 10 while maintaining the same combustor firing temperature for emissions control. Furthermore, bypassing of the ExB air enables the exhaust gas temperature of the gas turbine engine 10 to be increased during turndown. This may be achieved by further closing the inlet guide vanes 13, which may result in an additional reduction of the load output at turndown of about five percent (5%) to ten percent (10%).

For example, and without limitation, in one embodiment, the gas turbine engine 10 may have a base load output of about one hundred and ninety Megawatts (190 MW). The HRSG 26 may have an inlet gas temperature limit of about one thousand one hundred seventy-five degrees Fahrenheit (1,175° F.). A minimum turndown load of the gas turbine engine 10 without the use of ExB air may be in a range between and including about thirty-four percent (34%) (i.e., about 65 MW) and about thirty-seven percent (37%) (i.e., about 70 MW) load. This example minimum turndown load may be limited by limiting the exhaust gas temperature of the gas turbine engine 10 to about one thousand one hundred seventy-five degrees Fahrenheit (1,175° F.), the inlet air temperature limit of the HRSG 26.

However, by turning on the ExB system 31 to bypass the ExB air, the gas turbine engine 10 may be reduced to a minimum turndown load of about fifty-five Megawatts (55 MW) to about fifty-seven Megawatts (57 MW). The resulting exhaust gas temperature at the entrance of the HRSG 26 may be reduced by about thirty to forty degrees Fahrenheit (30°–40° F.) due to the mixing of the ExB air with the exhaust gas air. As described above, this reduced exhaust gas temperature allows the exhaust gas temperature of the gas turbine engine 10 (at the exit of the turbine 20) to be increased. Accordingly, increasing the exhaust gas temperature of the gas turbine engine 10 such that a temperature of the mixed exhaust gas (i.e., the missed ExB air and exhaust gas air) is about one thousand one hundred seventy-five degrees Fahrenheit (1,175° F.), the inlet air temperature limit of the HRSG 26, enables the minimum turndown load of the gas turbine engine 10 to be reduced to about fifty Megawatts (50 MW) to about fifty-two Megawatts (52 MW).

As such, the various embodiments of the gas turbine engine 10 provide significant operating advantages, including: decreasing the turndown limits while still maintaining NOx and CO emissions compliance; reducing a need for attemperation (spray water) in the super heater section of the HRSG 26 required to control the high pressure steam temperature into the steam turbine; increasing the overall efficiency of the gas turbine engine 10; reducing maintenance intervals and costs for the gas turbine engine 10, the HRSG 26, and the steam turbine; and reducing operating costs of the gas turbine engine 10.

Figure 3:
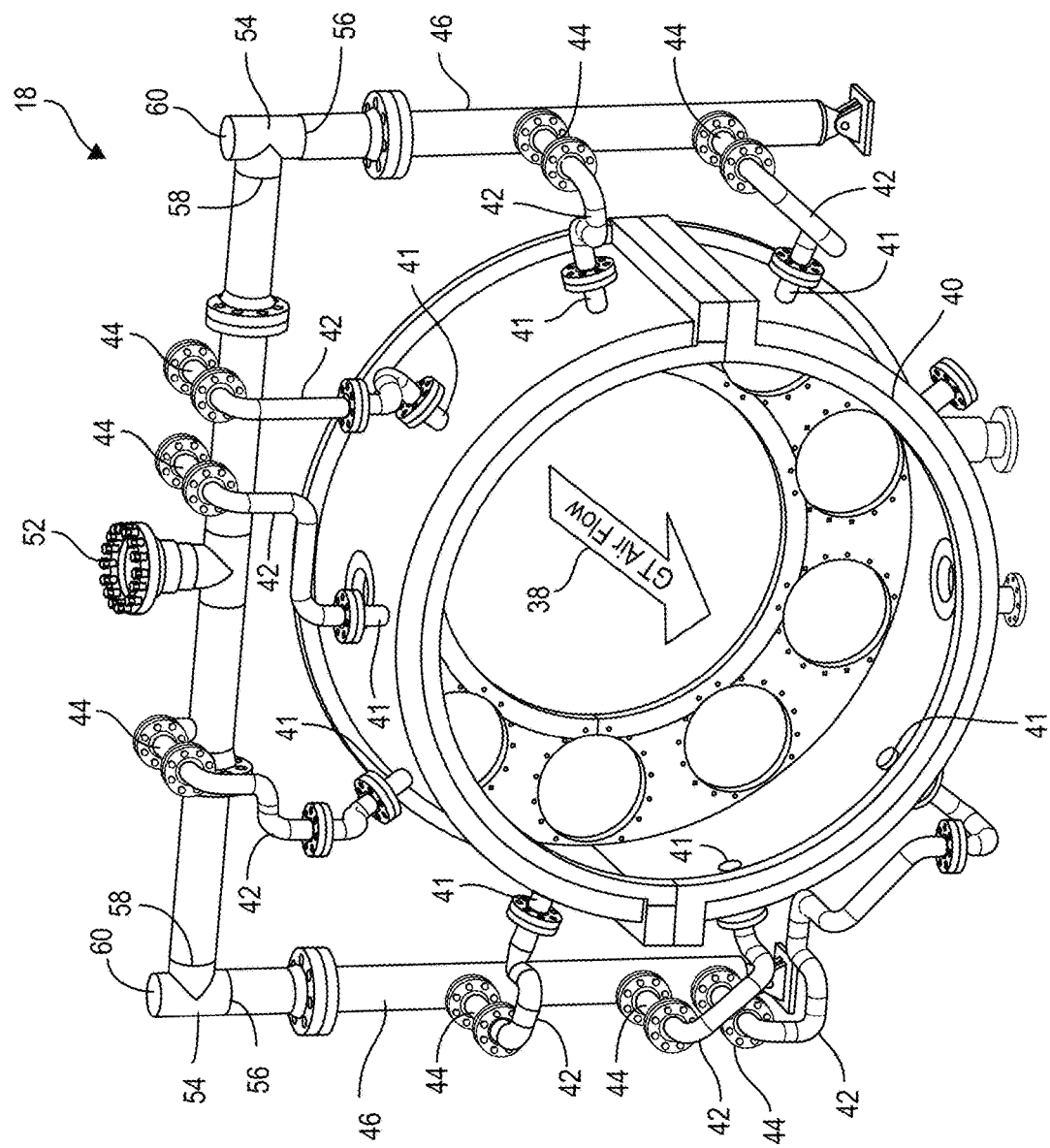
FIG. 3 is a perspective view of one embodiment of a compressor discharge casing of the gas turbine engine shown in FIGS. 1-2.
Figure 4:
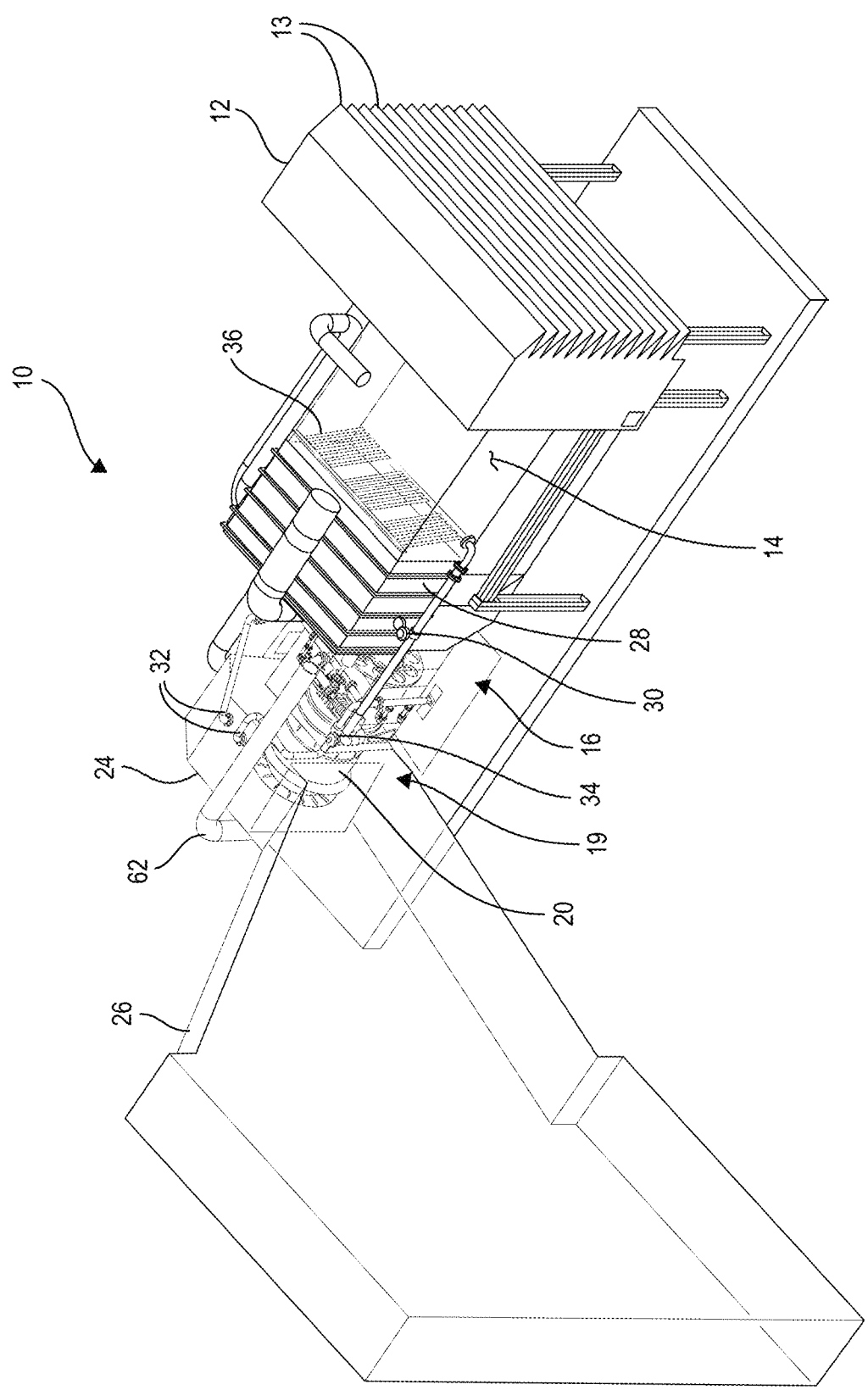
FIG. 4 is a perspective view of the gas turbine engine schematically represented in FIG. 1 and including the compressor discharge casing shown in FIG. 3.
Figure 5:
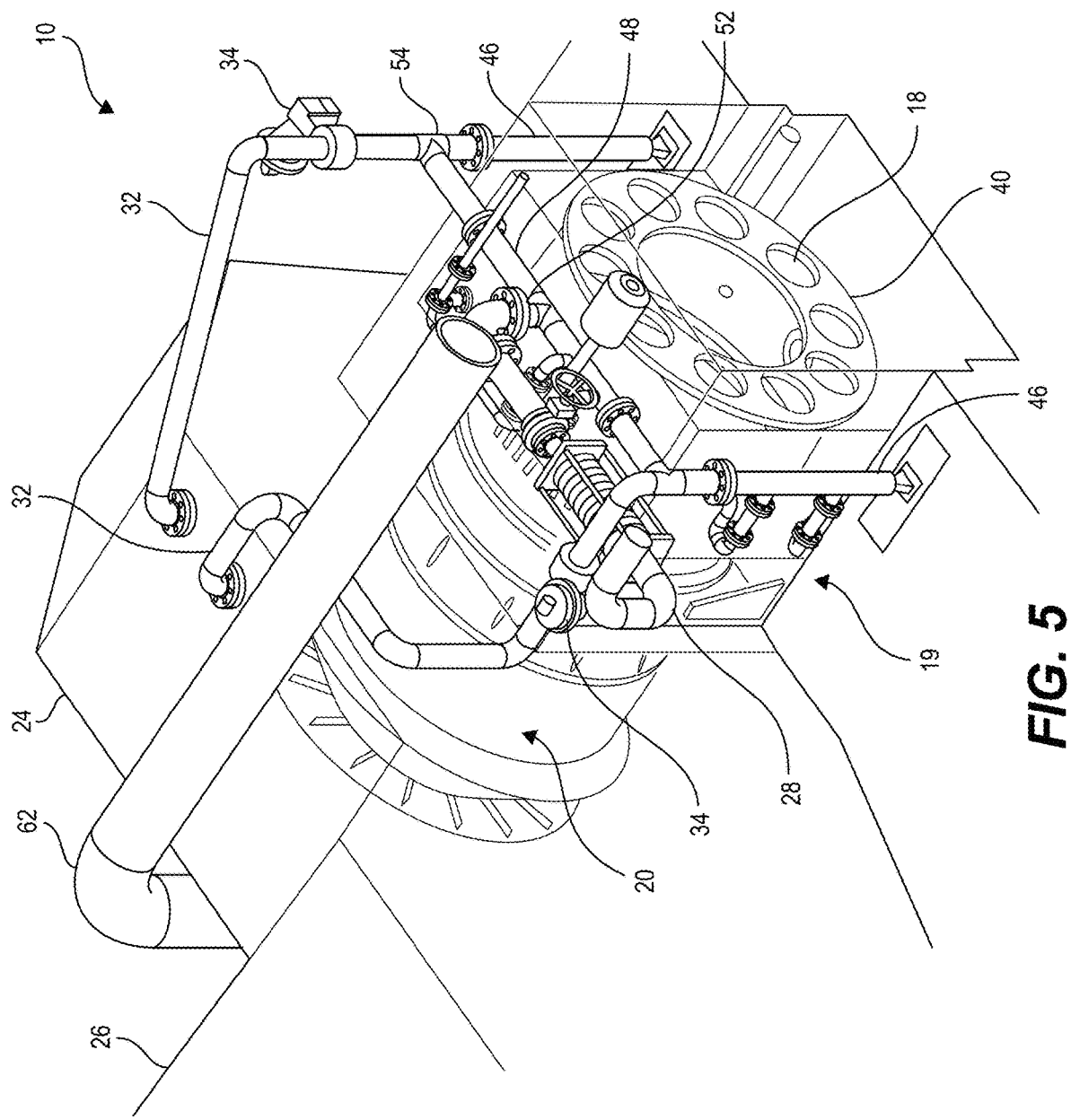
FIG. 5 is a close-up perspective view of a portion of the gas turbine engine shown in FIG. 4.

Turning now to FIGS. 3-5, components of the IBH system 27 and the ExB system 31 are shown in more detail. FIG. 3 shows an embodiment of the compressor discharge casing/extraction manifold 18. The compressor discharge casing/extraction manifold 18 generally includes an annular casing 40 including a single or an array of bleed outlets 41 about the outer circumference thereof. Coupled to each respective bleed outlet 41 is an extraction pipe 42, with each extraction pipe 42 coupled to one of a vertical manifold 46 or a horizontal manifold 48 via a coupler 44. The compressor discharge casing/extraction manifold 18 includes a pair of tee couplers 54. Each tee coupler 54 includes three channels 56, 58, 60, with a first channel 56 of each coupled to a respective vertical manifold 46, a second channel 58 of each coupled to the horizontal manifold 48, and the third channel 60 of each coupled to the ExB piping 32 (FIGS. 4-6).

The manifolds 46 and 48 are in fluid communication with the IBH piping 28 (FIGS. 1-2) via an IBH coupling 52 provided generally at a center of the horizontal manifold 48. During operation of the IBH system 27, the IBH valve 30 is opened permitting compressed air to flow through each of the bleed outlets 41, through the respective extraction pipe 42 and coupler 44 and into one of the vertical manifolds 46 and horizontal manifold 48, through the IBH piping coupling 52 and thus the IBH piping 52, and ultimately is reinjected into the inlet duct 14 via the injection manifold 36, as described herein.

When the IBH system 27 is in operation (that is, when the IBH valve 30 is opened) but the ExB system 31 is not, compressed air leaving the compressor discharge casing/extraction manifold 18 ultimately flows upstream to the inlet duct 14 but not downstream, and thus compressed air will flow through the first and second channels 56, 58 of the tee couplers 54 but will be static at the third channel 60. However, when both the IBH system 27 and the ExB system 31 are in operation (that is, when both the IBH valve 30 and the ExB valve 34 are opened), compressed air leaving the compressor discharge casing/extraction manifold 18 ultimately flows both upstream to the inlet duct 14 and downstream to the exhaust system (exhaust manifold 24, HRSG 26, or similar) and thus compressed air will flow through all three channels 56, 58, 60 of the tee couplers 54.

Figure 6:
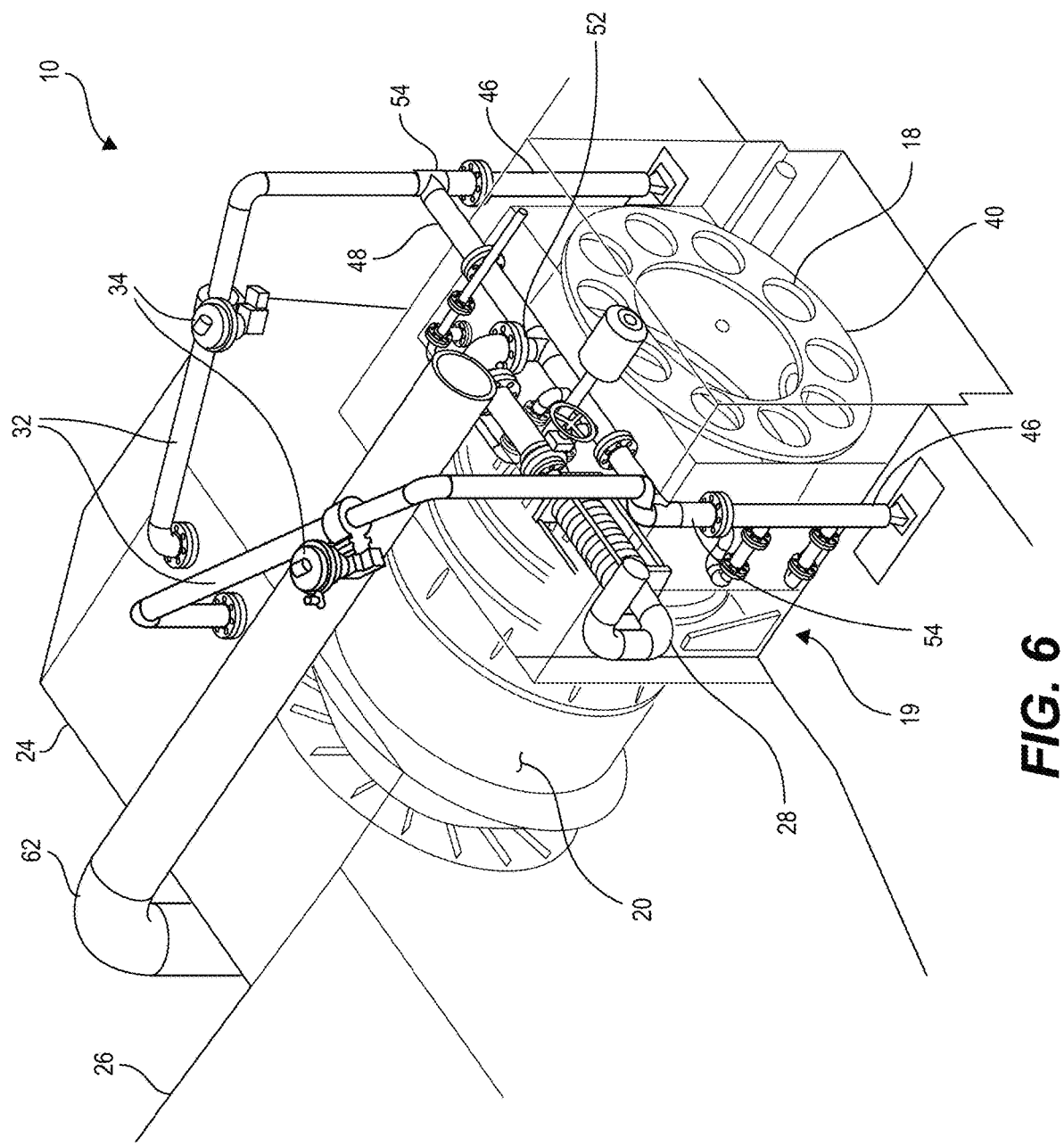
FIG. 6 is a close-up perspective view of a portion of the gas turbine engine similar to the one shown in FIG. 4 but including an alternative arrangement of an exhaust bleed piping configuration.

FIGS. 4-6 show a gas turbine engine 10 including the compressor discharge casing/extraction manifold 18 discussed in connection with FIG. 3. The embodiments depicted in FIGS. 4-6 are nearly identical except that in the first embodiment, shown in FIGS. 4 and 5, one of the ExB pipes 32 is routed beneath the IBH piping 28 and a cooling duct 62 of the gas turbine engine 10, while in FIG. 6 the ExB pipe 32 is routed around the IBH piping 28 and over the cooling duct 62. In either case, the ExB system 31 generally includes two ExB pipes 32, each one including a respective ExB valve 34. The ExB pipes 32 are in turn routed directly to the exhaust manifold or plenum 24, but, as discussed, in other embodiments the ExB pipes 32 could be routed to another component of the exhaust system such as, for example, directly into the HRSG 26. During operation, the ExB valves 34 are operated during a period of turndown thereby allowing compressed bleed air to bypass the combustor 19 and turbine 20 and thus allowing for increased turndown of the gas turbine engine while remaining within acceptable emission limits, as described herein.

Control Method for Improved Turndown

Figure 7:
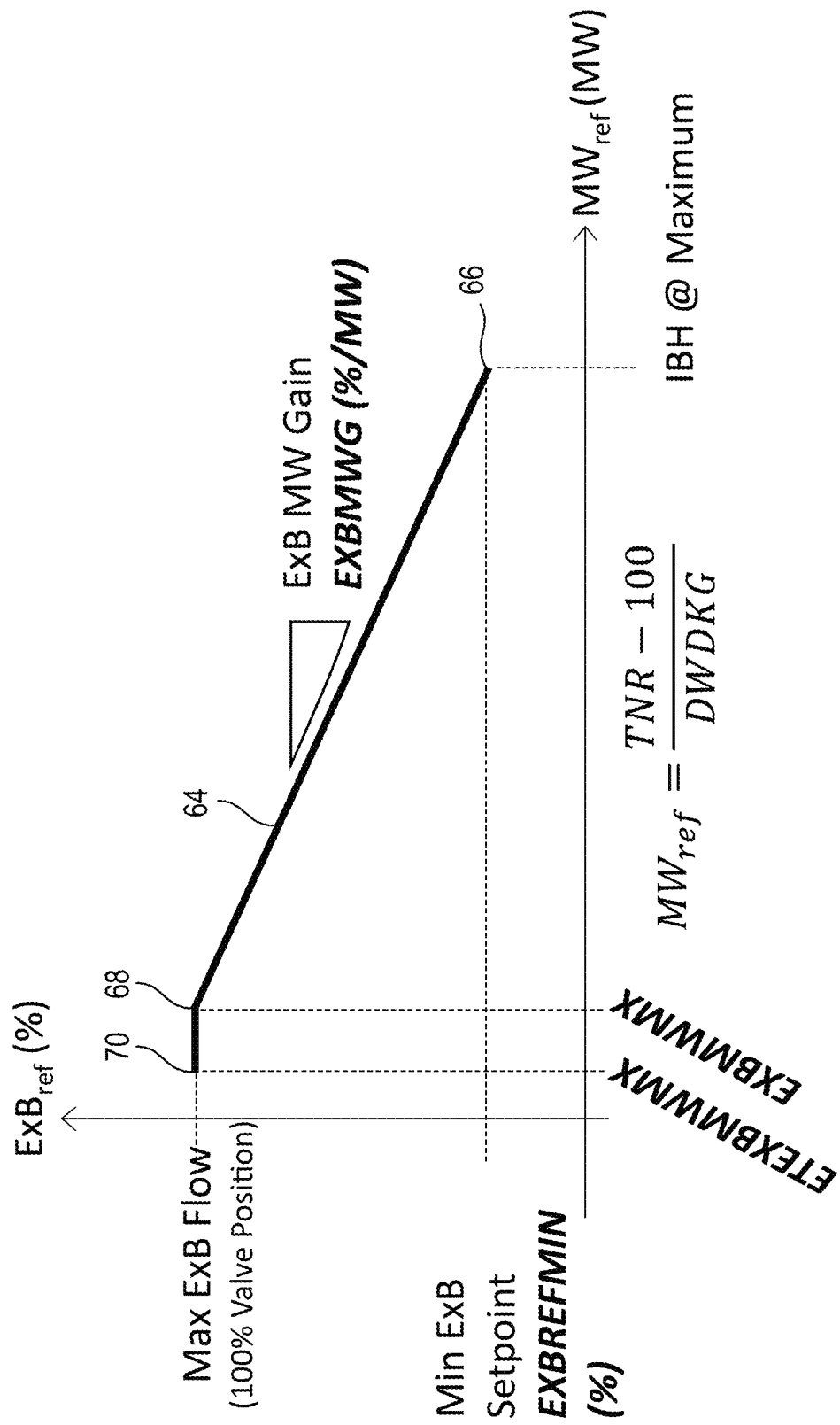
FIG. 7 is a graphical representation of an operating schedule of the exhaust bleed system during turndown of the gas turbine engine shown in FIGS. 1-6.
Figure 8:
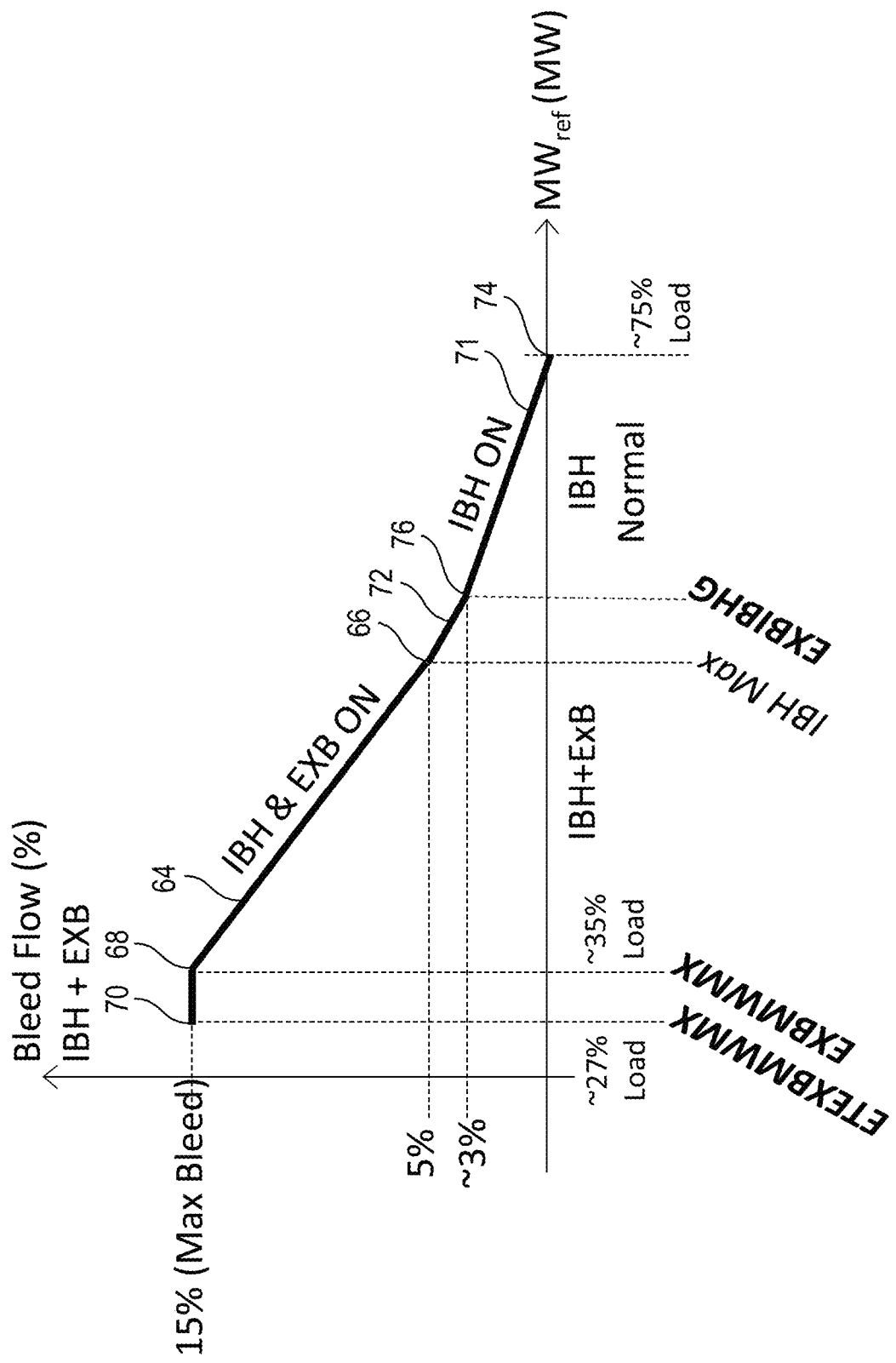
FIG. 8 is a graphical representation of an operating schedule of both the exhaust bleed system and the inlet bleed heat system during turndown of the gas turbine engine shown in FIGS. 1-6.

Turning now to FIGS. 7 and 8, various turndown control schemes for a gas turbine engine 10 implemented with an IBH system 27 and ExB system 32 will be discussed. First, FIG. 7 is a graphical representation of a schedule for the ExB system 31 versus a reference (that is, target or demand) load, shown in FIG. 7 as MWref. The reference load is a calculated value using parameters known to a gas turbine engine controller 11. More particularly, $MWref=(TNR-100)/DWDKG$. In this equation, TNR is a speed reference value corresponding to the turbine speed setpoint and is expressed in percentage of rated speed of the turbine. For a typical turbine rated at 3600 rpm, TNR will equal 100% when the speed setpoint is 3,600 rpm. The gas turbine engine 10 produces rated turbine output at a speed reference value above 100%. More particularly, a TNR of 100% refers to 0% load, while 100% load is typically achieved when TNR is equal to approximately 104%. Thus, during load control (that is, during a period of turndown), the turbine will be operating with TNR in the range of 100%-104%. DWDKG is a control constant that converts the difference of TNR and 100 to a Megawatt value; i.e., to the reference load. The reference load (MWref) in turn may be used in the IBH system 27 and ExB system 31 control logic to determine an amount of compressed air to bleed to the inlet duct 14 and exhaust system, respectively.

In some embodiments, the ExB system 31 will be operated according to a linear schedule based on the reference load, such as the ExB schedule 64 depicted in FIG. 7. More particularly, in the graphical representation of the schedule for the ExB system 31 shown in FIG. 7, the reference load (MWref) is provided along the x-axis and a bleed flow percentage is provided along the y-axis. The ExB system 31 is configured to operate starting at point 66 and ending at point 68. As will become more apparent via the discussion of FIG. 8 below, the starting point 66 is at a reference load (IBH @ Maximum) where the IBH system 27 is operating at a maximum flow value; that is, where the IBH valve 30 is fully open. At this point, there is thus already some bleed flow due to the operation of the IBH system 27 (e.g., about 5%).

Bleed flow from the ExB system 31 is continually increased (that is, the ExB valve 34 is continually opened) at a predetermined rate or gain (EXBMWG) as reference load continues to decrease, until the ExB system 31 reaches a maximum bleed flow (that is, until the ExB valve 34 is fully open) at ending point 68. The reference load corresponding to the ending point 68 is referred to as EXBMWMX in FIG. 7, and the percentage bleed flow at this position is referred to as Max ExB Flow. In one non-limiting example, the ExB system 31 is configured to bleed approximately 10% compressed air in addition to that being bled by the IBH system 27.

After the IBH system 27 and the ExB system 31 are fully open, thereby flowing a maximum amount of bleed air, the exhaust gas temperature may be measured at a point downstream of the location of where the ExB air is reinjected into the exhaust system, such as the inlet to the HRSG 26. As described herein, mixing of the ExB air and the exhaust gas air results in a reduced temperature of the exhaust gases at the inlet to the HRSG 26. Based on the measured temperature of the mixed MxB air and exhaust gas air, the exhaust gas temperature setpoint of the gas turbine engine controller 11 may be adjusted, such as increased. In particular, the exhaust gas temperature setpoint may be adjusted until the measured temperature of the mixed MxB air and exhaust gas air reaches a limit (or threshold value) of the inlet air temperature of the HRSG 26. This process may include the gas turbine engine controller 11 continuously measuring the temperature of the mixed MxB air and exhaust gas air while substantially simultaneously adjusting the exhaust gas temperature setpoint of the gas turbine engine 10 to reach, and then maintain, the measured temperature at the threshold value. This adjusted exhaust gas temperature setpoint allows for a further reduction in the turndown load of the gas turbine engine 10, as depicted at point 70 (ETEXBMWMX) in FIG. 7.

In some embodiments, after the measured temperature of the mixed MxB air and exhaust gas air reaches the inlet temperature limit of the HRSG 26, the gas turbine engine controller 11 may decrease the exhaust gas temperature setpoint a predetermined amount to allow for a margin of safety in operating the gas turbine engine 10 without having mixed MxB air and exhaust gas air exceed the inlet temperature limit of the HRSG 26.

FIG. 8 is a graphical representation of the entire bleed schedule 69 for the gas turbine engine 10, which includes both the IBH system 27 and the ExB system 31. The ExB schedule 64 depicted in FIG. 8 is the same as that shown and discussed in connection with FIG. 7. The bleed schedule 69 also includes the operation of the IBH system 27, which includes an IBH normal schedule 71 and an IBH max schedule 72. The IBH normal and max schedules 71, 72 include different gain values; more particularly, the bleed flow from the IBH system 27 is increased more rapidly during the IBH max schedule 72 than during the IBH normal schedule 71.

The IBH system 27 operates between a first reference load corresponding to staring point 74 of the IBH system 27 and a second reference load corresponding to the starting point 66 of the ExB system 31. The IBH system 27 will operate at a first gain between the starting point and an intermediate point 76 (that is the IBH valve 30 will open at a first rate when the reference load is between the first reference load and an intermediate reference load corresponding to the intermediate point 76) and will operate at a second gain between the intermediate point 76 and the starting point 66 of the ExB system 31. In some embodiments, the IBH system 27 may be configured to operate according to the IBH normal schedule 71 up to approximately 3% bleed flow, and thereafter operate according to the IBH max schedule 72 until the IBH valve 30 is fully open at approximately 5% bleed flow. At this point, the ExB system 31 will begin, and follow the ExB schedule 64 as described above.

During turndown operation of the gas turbine engine 10, the load is decreased below the base load. This is achieved by lowering the setpoint speed (TNR) below 104%, as discussed. Consequently, the fuel flow to the gas turbine engine 10 will decrease, and the inlet guide vanes 13 will in turn start to close to maintain an appropriate fuel/air ratio for the engine 10. As load continues to decrease, emissions increase. Thus, it becomes desirable to operate the IBH system 27 and/or the ExB system 31 to maintain emissions below an acceptable limit.

To do so, the gas turbine engine controller 11 or the like will continually determine a reference load (MWref). If the reference load falls below a first threshold value, the controller 11 will operate the IBH system 27. In the depicted embodiment, the first threshold value is the reference load corresponding to the IBH starting point 74 and is approximately 75% of the base load. The controller 11 will thereafter increase the amount of bleed air flowing through the IBH system 27 as the reference load decreases, following the gain dictated by the IBH normal schedule 71. When the reference load reaches a second threshold value, represented by EXBIBHG, the controller 11 will follow the IBH max schedule 72. In the depicted embodiment, the IBH max schedule 72 is operated from approximately 3% bleed flow to approximately 5% bleed flow, which is the maximum achievable bleed flow by the IBH system 27 alone.

If the reference load is decreased beyond the point where the IBH valve 30 is fully open and thus IBH bleed flow is at a maximum (point 66 in FIG. 9), the controller 11 will begin to bleed compressed air through the ExB system 31 following the ExB schedule 64 in order to keep emissions at an acceptable level. More particularly, when the reference load falls beyond a third threshold value (that is, a load corresponding with point 66) the controller 11 opens the ExB valve 34 at a gain dictated by the ExB schedule 64. In this regard, the controller 11 will continue to open the ExB valve 34 as the reference load decreases up to a fourth threshold value, referred to as EXBMWMX, at which point the ExB valve 34 is fully open and thus the system 31 is operating at a maximum bleed flow. In the depicted embodiment, this corresponds to a total flow rate of approximately 15%, which includes approximately 5% bleed flow through the IBH system 27 and approximately 10% bleed flow through the ExB system 31. This results in a greater turndown that is achievable by using the IBH system 27 alone; in the depicted embodiment turndown to approximately 35% of base load.

At point 68, the gas turbine engine emissions are very near the emissions limit. To achieve additional turndown, the controller 11 adjusts the exhaust gas temperature setpoint of the gas turbine engine 10 upward to facilitate maintaining emissions below the limit while further reducing the turndown load. As discussed above, the controller 11 measures or otherwise receives the exhaust gas temperature at a point downstream of the location of where the ExB air is reinjected into the exhaust system, such as the inlet to the HRSG 26. The controller 11 may adjust the exhaust gas temperature setpoint until the measured temperature of the mixed MxB air and exhaust gas air reaches the limit (or threshold value) of the inlet air temperature of the HRSG 26. The controller 11 may continuously measure the exhaust gas temperature and adjust the exhaust gas temperature setpoint to reach and maintain the measured temperature at the threshold value. This results in a greater turndown than is achievable by using the IBH system 27 and the ExB system 31 alone; in the depicted embodiment turndown to approximately 27% of base load. Any further turndown may result in operating the gas turbine engine 10 out of compliance.

From the foregoing, it will be seen that this disclosure is one well adapted to attain all the ends and objects set forth above, together with other advantages which are inherent to the system and method. It will be understood that certain features and sub-combinations are of utility and may be employed without reference to other features and sub-combinations.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

1. A method of operating a gas turbine engine during a period of turndown, the method comprising:
   continuously decreasing a load of the gas turbine engine below a base load;
   as the load is continually decreased, continuously determining a reference load for the gas turbine engine;
   when the reference load reaches a first threshold value, operating an inlet bleed heat (IBH) system of the gas turbine engine according to a first schedule;
   when the reference load reaches a second threshold value, operating the IBH system according to a second schedule;
   when the reference load reaches a third threshold value, operating an exhaust bleed (ExB) system of the gas turbine engine according to a third schedule; and
   when the reference load reaches a fourth threshold value:
      continuously measuring an exhaust gas temperature of the gas turbine engine at an inlet of a heat recovery steam generator coupled in flow communication to the gas turbine engine, and
      maintaining the measured exhaust gas temperature at a predetermined threshold temperature value by continuously adjusting an exhaust gas temperature setpoint of the gas turbine engine while the gas turbine engine continues operating at a reference load below the fourth threshold value.

2. The method in accordance with claim 1, wherein the reference load is a function of a speed reference of the gas turbine engine.

3. The method in accordance with claim 1,
   wherein the IBH system includes an IBH valve, and
   wherein operating the IBH system comprises opening the IBH valve.

4. The method in accordance with claim 3,
   wherein at the third threshold value, the IBH valve is fully open.

5. The method in accordance with claim 1,
   wherein the ExB system includes an ExB valve, and
   wherein operating the ExB system comprises opening the ExB valve.

6. The method in accordance with claim 5,
   wherein during the third schedule, the ExB valve is opened at a third rate corresponding to a predetermined ExB gain value.

7. A method of operating a gas turbine engine during a period of turndown, the method comprising:
   continuously decreasing a load of the gas turbine engine below a base load;
   as the load is continually decreased, continuously determining a reference load for the gas turbine engine;
   when the reference load reaches a first threshold value, operating an inlet bleed heat (IBH) system of the gas turbine engine according to a first schedule;
   when the reference load reaches a second threshold value, operating the IBH system according to a second schedule;
   when the reference load reaches a third threshold value, operating an exhaust bleed (ExB) system of the gas turbine engine according to a third schedule; and
   when the reference load reaches a fourth threshold value, adjusting an exhaust gas temperature setpoint of the gas turbine engine,
   wherein the IBH system includes an IBH valve,
   wherein operating the IBH system comprises opening the IBH valve,
   wherein during the first schedule, the IBH valve is opened at a first rate corresponding to a predetermined first IBH gain value, and
   wherein during the second schedule, the IBH valve is opened at a second rate corresponding to a predetermined second IBH gain value, the second rate being greater than the first rate.

8. A gas turbine engine comprising:
   an air inlet;
   a compressor downstream of the air inlet and fluidly connected to the air inlet via an inlet duct;
   a compressor discharge casing downstream of the compressor;
   a combustion system downstream of the compressor discharge casing;
   a turbine downstream of the combustion system;
   an exhaust system downstream of the turbine;
   an inlet bleed heat (IBH) system including IBH piping fluidly connecting the compressor discharge casing to the inlet duct and an IBH valve configured to open and close the IBH piping;
   an exhaust bleed (ExB) system including ExB piping fluidly connecting the compressor discharge casing to the exhaust system and an ExB valve configured to open and close the ExB piping; and a controller configured to operate the IBH system by opening the IBH valve, operate the ExB system by opening the ExB valve, and adjust an exhaust gas temperature setpoint of the gas turbine engine, during a period of turndown, the controller being further configured to:
continuously decrease a load of the gas turbine engine below a base load;
as the load is continually decreased, continuously determine a reference load for the gas turbine engine;
when the reference load reaches a first threshold value, operate the IBH system according to a first schedule, including opening the IBH valve at a first rate corresponding to a predetermined first IBH gain value during the first schedule;
when the reference load reaches a second threshold value, operate the IBH system according to a second schedule, including opening the IBH value at a second rate corresponding to a predetermined second IBH gain value during the second schedule, the second rate being greater than the first rate;
when the reference load reaches a third threshold value, operate the ExB system according to a third schedule; and
when the reference load reaches a fourth threshold value, adjust an exhaust gas temperature setpoint of the gas turbine engine,
wherein with both the IBH system and the ExB system operating, and the exhaust gas temperature being adjusted, the gas turbine engine is configured to achieve a greater turndown while maintaining NOx and CO emissions within a compliance limit than if the gas turbine engine was not equipped with the ExB system.

9. The gas turbine engine in accordance with claim 8, the exhaust system comprising an exhaust manifold, the ExB piping being fluidly connected to the exhaust manifold.

10. The gas turbine engine in accordance with claim 8, the exhaust system comprising a heat recovery steam generator (HRSG), the ExB piping being fluidly connected to HRSG.

11. The gas turbine engine in accordance with claim 8, the exhaust system comprising a heat recovery steam generator (HRSG), the ExB piping being fluidly connected to the HRSG, the controller being further configured to continuously measure an exhaust gas temperature at an inlet of the HRSG.

12. The gas turbine engine in accordance with claim 11, wherein adjusting the exhaust gas temperature setpoint includes the controller being further configured to adjust the exhaust gas temperature setpoint until the measured exhaust gas temperature reaches a predetermined threshold temperature value.

13. The gas turbine engine in accordance with claim 8, the controller being further configured to open the ExB valve at a third rate corresponding to a predetermined ExB gain value during the third schedule.

14. The gas turbine engine in accordance with claim 8, wherein the reference load is a function of a speed reference of the gas turbine engine.

15. A gas turbine engine comprising:
an air inlet;
a compressor downstream of the air inlet and fluidly connected to the air inlet via an inlet duct;
a compressor discharge casing downstream of the compressor;
a combustion system downstream of the compressor discharge casing;
a turbine downstream of the combustion system;
an exhaust system downstream of the turbine;
an inlet bleed heat (IBH) system including IBH piping fluidly connecting the compressor discharge casing to the inlet duct and an IBH valve configured to open and close the IBH piping;
an exhaust bleed (ExB) system including ExB piping fluidly connecting the compressor discharge casing to the exhaust system and an ExB valve configured to open and close the ExB piping; and
a controller configured to operate the IBH system by opening the IBH valve, operate the ExB system by opening the ExB valve, and adjust an exhaust gas temperature setpoint of the gas turbine engine, during a period of turndown,
wherein with both the IBH system and the ExB system operating, and the exhaust gas temperature being adjusted, the gas turbine engine is configured to achieve a greater turndown while maintaining NOx and CO emissions within a compliance limit than if the gas turbine engine was not equipped with the ExB system,
the controller being further configured to:
continuously decrease a load of the gas turbine engine below a base load;
as the load is continually decreased, continuously determine a reference load for the gas turbine engine;
when the reference load reaches a first threshold value, operate the IBH system according to a first schedule;
when the reference load reaches a second threshold value, operate the IBH system according to a second schedule;
when the reference load reaches a third threshold value, operate the ExB system according to a third schedule; and
when the reference load reaches a fourth threshold value, adjust an exhaust gas temperature setpoint of the gas turbine engine,
the exhaust system comprising a heat recovery steam generator (HRSG),
the ExB piping being fluidly connected to the HRSG,
the controller being further configured to continuously measure an exhaust gas temperature at an inlet of the HRSG,
wherein adjusting the exhaust gas temperature setpoint includes the controller being further configured to adjust the exhaust gas temperature setpoint until the measured exhaust gas temperature reaches a predetermined threshold temperature value,
the controller being further configured to maintain the measured exhaust gas temperature at the predetermined threshold temperature value when the measured exhaust gas temperature reaches the predetermined threshold temperature value,
the maintaining including continuously adjusting the exhaust gas temperature setpoint until the reference load reaches a fifth threshold value.

* * * * *